3,706,756
AMINOALKYL-SPIROCYCLOALKANES
Lincoln Harvey Werner, Summit, N.J., assignor to Ciba-Geigy Corporation, Summit, N.J.
No Drawing. Continuation-in-part of application Ser. No. 723,585, Apr. 23, 1968. This application Feb. 3, 1969, Ser. No. 796,166
Int. Cl. C07c 87/28; C07d 27/56, 31/44
U.S. Cl. 260—295.5                     6 Claims

ABSTRACT OF THE DISCLOSURE

1 - aminoalkyl - benzcycloalkane-2-spirocycloaliphatic compounds, e.g. those of the formula

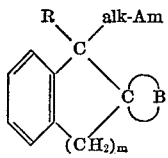

alk=lower alkylene
Am=an amino group
R=H or OH; $m=1-3$
B=lower alkylene or alkenylene acyl and 1-dehydro derivatives, N-oxides, quaternaries and salts thereof exhibit analgetic effects.

CROSS-REFERENCES TO RELATED APPLICATIONS

This is a continuation-in-part of application Ser. No. 723,585, filed Apr. 23, 1968.

SUMMARY OF THE INVENTION

The present invention concerns and has for its object the provision of new 1-aminoalkyl-benzcycloalkane-2-spirocycloaliphatic compounds, preferably of those having the Formula I

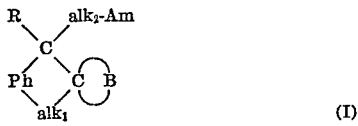

in which Ph is a 1,2-phenylene radical, $alk_1$ is lower alkylene contributing 1 to 3 ring-carbon atoms, B is lower alkylene or alkenylene contributing 4 to 6 ring-carbon atoms, $alk_2$ is lower alkylene, Am is an amino group and R is hydrogen or hydroxy, the 1-dehydro-derivatives (wherein $alk_2$ is alkylidene), acyl derivatives, N-oxides, quaternaries and salts thereof, as well as of corresponding pharmaceutical compositions and of methods for the preparation and application of these products. Said compositions are especially useful as analgetic agents.

DESCRIPTION OF THE PREFERRED EMBODIMENTS

The 1,2-phenylene radical Ph is unsubstituted or substituted by one or more than one of the same or of different substituents attached to any of the four positions available for substitution. Such substituents are primarily lower alkyl, e.g. methyl, ethyl, n- or i-propyl or -butyl, free, etherified or esterified hydroxy, such as lower alkoxy, e.g. methoxy, ethoxy, n- or i-propoxy or -butoxy, lower alkanoyloxy, e.g. acetoxy or propionyloxy, or halogeno, e.g., fluoro, chloro or bromo, trifluoromethyl, nitro or amino, especially di-lower alkylamino, e.g. dimethylamino or diethylamino. The term "lower" referred to above or hereinafter in connection with organic radicals or compounds respectively, defines such with up to 7, preferably up to 4, carbon atoms. More particularly Ph stands for 1,2-phenylene, (lower alkyl)-1,2-phenylene, (hydroxy)-1,2-phenylene, mono- or di-(lower alkoxy)-1,2-phenylene, (lower alkanoyloxy) - 1,2 - phenylene, (halogeno) - 1,2-phenylene or (trifluoromethyl)-1,2-phenylene.

The lower alkylene portion $alk_1$ above all represents methylene, 1,2-ethylene or 1,3-propylene, but also represents 1,1-ethylene, 1,1-, 1,2- or 2,2-propylene, 2-methyl-1,3-propylene, 1,1-, 1,2-, 1,3-, 2,2- or 2,3-butylene, 1,1-, 1,2-, 1,3-, 2,2-, 2,3-, 2,4- or 3,3-pentylene, 1,3- or 2,3-hexylene or 3,5-heptylene.

The lower alkylene or alkenylene radical B preferably represents 1,4-butylene, 1,5-pentylene or 1,5-pent-2-enylene, but also represents 1,4-pentylene, 1,4-, 1,5-, 2,5- or 1,6-hexylene, 1,4-, 1,5-, 1,6-, 2,5- or 2,6-heptylene; 1,4-but-2-enylene, 1,4-pent-2-enylene, 1,6-hex-3-enylene or 2,6-hept-3-enylene.

The lower alkylene radical $alk_2$ above all stands for 1,2-ethylene, 1,2- or 1,3-propylene, but also for 2-methyl-1,3-propylene, 1,2-, 1,3-, 1,4- or 2,3-butylene, 1,5- or 2,4-pentylene, 1,3- 1,4- or 1,6-hexylene or 3,5-heptylene.

The amino group Am is a primary, secondary or preferably a tertiary amino group, such as amino, mono- or di-lower alkylamino, e.g. methylamino, ethylamino, n- or i-propylamino or n-butylamino; dimethylamino, N-methyl-N-ethylamino, diethylamino, di-n-propylamino, di-isopropylamino or di-n-butylamino; free or esterified hydroxy-lower alkylamino, N-(hydroxy-lower alkyl)-N-lower alkylamino or di-(hydroxy-lower alkyl)-amino, in which hydroxy is separated from the amino nitrogen by at least 2 carbon atoms, e.g. 2-hydroxyethylamino, 3-hydroxypropylamino, N-(2-hydroxyethyl) - N-methylamino or di - (2 - hydroxyethyl)amino; monocyclic cycloalkylamino, cycloalkyl-lower alkylamino, N-cycloalkyl-N-lower alkylamino or N-cycloalkyl-lower alkyl-N-lower alkylamino in which cycloalkyl has preferably 3 to 7 ring-carbon atoms, e.g. cyclopropylamino, cyclopentylamino, cyclohexylamino, cyclopropylmethylamino, 2-cyclopentyl-ethylamino, N-cyclopentyl-N-methylamino, N - cyclohexyl-N-methylamino, N-cyclohexyl-N-ethylamino, N-cyclopentylmethyl-N-ethylamino or N-(2-cyclopentylethyl)-N-methylamino, aralkylamino or N-lower alkyl-N-aralkylamino, in which the aryl, e.g. phenyl, moiety as unsubstituted or substituted as shown for Ph above, such as benzylamino, 2-phenethylamino, N - methyl - N - benzylamino, N-ethyl-N-benzylamino or N-ethyl-N-(1- or 2-phenethyl)-amino; lower alkyleneimino or free or esterified hydroxy-alkyleneimino, e.g. ethylene imino, pyrrolidino, 2-methyl-pyrrolidino, piperidino, 2- or 4-methyl-piperidino, 3- or 4-hydroxy-piperidino, 3-hydroxymethyl-piperidino, 1,6- or 2,5-hexamethyleneimino, 1,7- or 2,6-heptamethyleneimino, lower mono-oxa- or thia-alkyleneimino, e.g. morpholino, 3-methyl-morpholino or thiamorpholino, monoaza-lower alkyleneimino, N-lower alkyl- or free or esterified N-(hydroxy-lower alkyl)-monoaza-lower alkyleneimino, e.g. piperazino, N-methyl, -ethyl-, -n-propyl-, -i-propyl-, -2-hydroxyethyl- or -3-hydroxy - propyl - piperazino, N-methyl-, -2-hydroxy-ethyl- or -n-propyl-3-aza-1,5- or 1,6-hexyleneimino, or N-methyl-4-aza-1,7- or 2,6-heptyleneimino. The amino group Am may also be linked with the $alk_2$ moiety, so that $alk_2$-Am together represents, for example, aza-cycloalkyl, aza-cycloalkyl-lower alkyl, N-lower alkyl-aza-cycloalkyl or N-lower alkyl-aza-cycloalkyl-lower alkyl, e.g. 2- or 3-pyrrolidyl, 1-methyl- or -ethyl-3-pyrrolidyl, 3- or 4-piperidyl or -piperidylmethyl, 1-methyl or -ethyl-3- or 4-piperidyl or -piperidylmethyl. In the corresponding compounds of Formula I, the heteroatoms in the saturated moieties, e.g. those present in Am, are separated from each other by at least 2 carbon atoms.

Acyl derivatives of the invention are preferably those of the primary or secondary amines or hydroxyalkyl compounds. The acyl group therein stands preferably for lower alkanoyl, such as acetyl, propionyl, butyryl or pivalyl, but also for lower alkenoyl, such as acryloyl or methacryloyl, monocyclic carbocyclic aryl-lower alkanoyl or -alkenoyl, such as benzoyl, phenylacetyl or cinnamoyl. The quaternaries of the invention are preferably the lower alkyl or aralkyl, e.g. phenyl-lower alkyl quaternaries. Said acyl, alkyl or aralkyl radicals are unsubstituted or substituted, especially in the aromatic portion, as shown for Ph above.

Dehydration of the compounds of Formula I, wherein R is hydroxy, yields the 1-dehydro derivatives of the invention, in which the double bond can only extend into $alk_2$, thus rendering it to the corresponding alkylidene radical.

The compounds of the invention exhibit valuable pharmacological properties. For example, they show analgesic activity as can be demonstrated in animal tests, using advantageously mammals, such as rats, mice, or rabbits as test objects. Such tests can be performed as follows: A radiant heat stimulus is applied to the tail of male mice and the duration of exposure is measured. The end-point is the time at which the animal moves its tail away from the stimulus, which never is applied longer than 10 seconds. Usually ten mice are used for each test and two pre-drug time values are obtained from each animal. Hereupon the compounds of the invention are orally or subcutaneously applied in the form of aqueous solutions or suspensions, for example, in the dosage range between about 1 and 200 mg./kg./day, preferably between about 10 and 100 mg./kg./day, and 15, 30 and/or 60 minutes thereafter two post-drug time values are obtained. To determine the presence of an analgesic effect, the control means is determined and 3 standard deviations are added; any value above said sum is considered a reactor value, i.e. such indicating analgesia.

In another test system, about 1 mm. holes are drilled to the dental pulp of 2 incisor teeth of anesthetised male rabbits. The following day electrodes are inserted into said holes and a current of about 6 v. is applied to the unanesthetized animal, at which value it usually starts licking, thus providing the control voltage values. Hereupon the compounds of the invention are applied as mentioned above in about the same dosage range and about 15 minutes thereafter again a current is applied until the animal starts licking. In case the voltage ranges above 6 and up to 14 v., analgesia is observed.

Particularly useful are compounds of the Formula I, in which Ph stands for 1,2-phenylene, (lower alkyl)-1,2-phenylene, (hydroxy)-1,2-phenylene, mono- or di-(lower alkoxy)-1,2-phenylene, (halogeno)-1,2-phenylene or (trifluoromethyl)-1,2-phenylene, $alk_1$ is methylene, 1,2-ethylene or 1,3-propylene, B is 1,4-butylene, 1,5-pentylene or 1,5-pent-2-enylene, R is hydrogen or hydroxy, $alk_2$ is 1,2-ethylene, 1,2- or 1,3-propylene and Am is di-lower alkylamino, lower alkyleneimino, mono-oxa-, -thia- or -aza-lower alkyleneimino or N-lower alkyl- or N-(hydroxy- or lower alkanoyloxy-lower alkyl)-monoaza-lower alkyleneimino, or $alk_2$-Am together represents N-lower alkyl-azacycloalkyl or -azacycloalkyl-lower alkyl, wherein the heteroatoms are separated from each other by at least 2 carbon atoms, the 1-dehydro derivatives and therapeutically useful acid addition salts thereof, as well as those compounds of Formula I and said functional derivatives, in which all the symbols have the meaning given in this paragraph, but Ph is also (lower alkanoyloxy)-1,2-phenylene, and B also 1,6-hexylene.

Especially valuable are compounds of Formula II

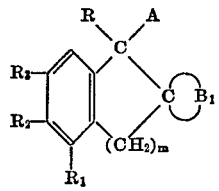

(II)

in which R is hydrogen or hydroxy, each of $R_1$, $R_2$ and $R_3$ is hydrogen or one or two thereof are lower alkoxy, or one thereof is hydroxy, lower alkanoyloxy or halogen and the others are hydrogen, A is di-lower alkylamino-lower alkyl, 1-lower alkyl-piperidyl or -piperidyl-lower alkyl, $B_1$ is 1,4-butylene, 1,5-pentylene, 1,6-hexylene or 1,5-pent-2-enylene and $m$ is the integer 1, 2 or 3, the 1-dehydro derivatives and therapeutically useful acid addition salts thereof.

Outstanding are those compounds of Formula II and said salts, in which R is hydrogen or hydroxy, each of $R_1$, $R_2$ and $R_3$ is hydrogen or one or two thereof are methoxy or one thereof is hydroxy, acetoxy or chloro and the others are hydrogen, A is 3-dimethylamino- or diethylamino-propyl or 1-methyl- or ethyl-3 or 4-piperidyl or -piperidyl-methyl, $B_1$ is 1,4-butylene, 1,5-pentylene, 1,6-hexylene or 1,5-pent-2-enylene and $m$ is the integer 1, 2 or 3, and the 1-dehydro derivatives thereof, especially the 1-(3-dimethylaminopropylidene) - 6 - methoxy - 1,2,3,4 -tetrahydronaphthalene-2-spiro-cyclopentane and therapeutically useful acid addition salts thereof, which show analgesic activity, for example, at a S.C. dose of about 50 mg./kg./day in the mouse tail-flick test, or at an oral dose of about 150 mg./kg./day in the rabbit tooth-pulp test.

The compounds of the invention are prepared according to methods known per se. For example, they are obtained by: (1) Converting in a 1-X-benzcycloalkane-2-spiroaliphatic compound of the formula

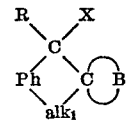

wherein X is a substituent capable of being converted into $alk_2$-Am, X into said aminoalkyl group or (2) Reacting a 1-oxo-benzcycloalkane-2-spiroaliphatic compound of the formula

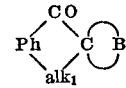

with a tert. aminoalkyl metal compound and hydrolyzing the resulting adduct and, if desired, converting any resulting compound into another compound of the invention.

In the starting material shown under item (1) the substituent X is, for example, (a) a metallic group, e.g. an alkali metal, e.g. lithium, or halomagnesium, or (b) a reactively esterified hydroxy-alkyl or a phosphonium-alkyl group, such as a (halogeno, sulfonyloxy or a triarylphosphonium halide)-alkyl group, e.g. (chloro, bromo, methanesulfonyloxy, ethanesulfonyloxy, benzenesulfonyloxy, tosyloxy, or triphenylphosphonium chloride)-alkyl or (c) a (nitro, oximino, imino, cyano, carbamoyl, isocyanato or esterified carboxyamino, e.g. carbalkoxyamino)-alkyl, -alkenyl, -alkanoyl or -hydroxyalkyl group, an aminoalkenyl -alkanoyl or -hydroxyalkyl group, cyano or preferably carbamoyl, e.g. COAm. The starting material corresponding to the X mentioned under item (a) is reacted with a reactively esterified, free or salified aminoalkanol or an unsubstituted or N-substituted ethyleneimine, that corresponding to the X mentioned under item (b) is reacted with H-Am or an alkali metal or acyl, e.g. phthaloyl, derivative thereof, and that corresponding to the X mentioned under item (c) is reduced and/or hydrolyzed. In the condensation of the reactively modified alcohol with ammonia or amines according to (1b), said basic agents are preferably used in excess, in order to neutralize the generated acid. They may, however, also be used in equivalent amounts and in the presence of other condensing agents such as inorganic or organic bases, e.g. alkali metal carbonates or bicarbonates or tertiary nitrogen bases, for example tri-lower alkylamines, N,N-dimethylaniline or pyridine. The reduction of the nitro compounds, nitriles, amides, isocyanates, urethanes or alkanoyl compounds according to item (1c) is advantageously performed with the use of simple or complex light metal hydrides, such as boron hydride or alkali metal aluminum or borohydrides, e.g. lithium aluminum hydride or sodium borohydride. In this reduction, the cyano and carbamoyl groups are converted into aminomethyl groups, the isocyanato or esterified carboxyamino groups into methylamino groups and the alkanoyl groups into alkyl or α-hydroxy alkyl groups. Said oximes, Schiff's bases (i.e. iminoalkyl- or aminohydroxyalkyl compounds) or said ω-amino-α-hydroxyalkyl reduction products of the alkanoyl compounds, as well as the nitro compounds and aminoalkenyl compounds, are preferably reduced with nascent hydrogen, such as hydrogen generated electrolytically or by the action of metals on acids or alcohols, e.g. zinc or iron and mineral or alkanoic acids, or with the use of catalytically activated hydrogen, e.g. hydrogen in the presence of nickel, platinum or palladium catalysts. Isocyanates and urethanes may also be subjected to hydrolysis, e.g. with the use of aqueous mineral acids or alkalies.

The metal compound mentioned under item (2) is preferably a Grignard compound, i.e. a halomagenesium, advantageously chloromagnesium compound, but also an alkali metal, e.g. lithium, compound. It is reacted with the oxo compound under the usual conditions, yielding, after hydrolysis with water or aqueous acid or ammonium salt solutions, compounds of the Formula I, in which R is hydroxy or, under dehydrating conditions, i.e. in strong acidic media, the 1-dehydro derivatives thereof.

The compounds of the invention so obtained can be converted into each other according to known methods. For example, in resulting 1-hydroxy- or 1-dehydro-derivatives or compounds in which B contains a double bond, said hydroxy group and/or double bond can be eliminated reductively, for example with the use of catalytically activated hydrogen. A hydroxy group R may also be eliminated by dehydration, e.g. by pyrolysis or with the use of dehydration agents, e.g. acids, their halides or anhydrides, such as sulfuric acid, acetyl chloride or acetanhydride, to yield the 1-dehydro derivatives. Compounds in which Am is a primary or secondary amino group, can be reacted with reactive esters of the corresponding alcohols, with lower alkyleneoxides, e.g. ethyleneoxide, or with aldehydes or ketones and reducing agents, e.g. formic acid, its functional derivatives or nascent hydrogen, in order to obtain secondary or tertiary amines, or quaternaries respectively. Resulting primary or secondary amines can also be acylated, for example, with a reactive functional derivative of a corresponding acid, such as a halide or anhydride thereof, or resulting acyl derivatives split, for example, with the use of acidic or alkaline hydrolyzing agents, or phthaloyl compounds with hydrazine, or reduced with simple or complex light metal hydrides. Resulting tertiary amines can be converted into N-oxides, for example by treating them with oxidation agents, such as hydrogen peroxide or peracids, e.g. aliphatic or aromatic percarboxylic acids. Furthermore, nitro groups may be introduced into aromatic moieties, e.g. by the action of nitric-sulfuric acid or by pyrolysis of nitrates, advantageously in acidic media, e.g. in trifluoro-acetic acid, or nitro groups present therein reduced, e.g. with nascent hydrogen. Resulting hydroxy-compounds, e.g. those of Formula I in which Ph or Am contains a hydroxy group, can be esterified and/or etherified, e.g. with the use of acid halides or anhydrides, including thionyl or phosphorus halides or oxyhalides, if desired, followed by the action of lower alkanols or alkali metal alkoxides. Resulting quaternaries can also be converted into tertiary amines, for example, from benzyl-quaternaries the benzyl residue can be split off by hydrogenation.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric, or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulonic, sulfanilic or cyclohexylsulfamic acid; methionine, tryptophane, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines or alcohols mentioned above may be used in the form of their alkali metal, e.g. sodium or potassium salts. Mainly, those starting materials should be used in the process of the invention that lead to the formation of those compounds indicated above as being specially valuable.

The starting material used is known or, if new, may be prepared according to known methods. For example, that used in reaction (1a) can be obtained by reduction of the 1-oxo compound shown under item (2) with sodium borohydride, converting the resulting 1-hydroxy compound into a reactive ester thereof, e.g. with the use of thionyl or phosphorus halides, and reacting the 1-halogeno compounds either with magnesium or alkali metals or their alloys. The starting material mentioned under items (1b) and (c) is prepared analogous to the method mentioned under item (2), e.g. by reacting an aliphatic metal or Grignard compound, e.g. that of the formula

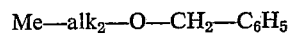

Me—alk$_2$—O—CH$_2$—C$_6$H$_5$ with the same oxo compound, subjecting the resulting adduct to hydrolysis and hydrogenation, in order to eliminate the benzyl group and, if desired, the 1-hydroxy group formed also. In the resulting compounds, the 1-hydroxyalkyl group can be modified according to methods known per se, for example reactively esterified, e.g. with strong mineral or sulfonic acids using, for example, thionyl halides or phosphorus halides or oxyhalides or sulfonyl halides, e.g. thionyl chloride, phosphorus tri- or pentabromide or oxychloride, tosyl or brosyl chloride, and resulting haloalkyl compounds reacted with phosphines, e.g. triphenylphosphine. The 1-hydroxyalkyl compounds may also be oxidized, for example, with hydrogen peroxide or heavy metal salts or oxides, e.g. alkali metal chromates or permanganates, chromic or cupric salts, mercuric, manganese or silver oxide, in acidic or alkaline media respectively. Resulting acids may then be converted into their halide, e.g. with the above acid derivatives, which may further be reacted with amines, or resulting aldehydes are converted into oximes or Schiff's bases. The 1-halogenoalkyl compounds can also be reacted with alkali metal cyanides or silver nitrite in order to obtain the 1-cyano or nitroalkyl starting material. Valuable intermediates in which X is formyl can be obtained from said ketones mentioned under item (2) by reaction with dimethyl sulfoniummethylide or methylide or dimethyl-oxysulfoniummethylide (generated from the corresponding trimethylsulfonium salts) and rearranging the resulting spiro-oxiranes (epoxides) to the corresponding aldehydes by the action of Lewis acids, e.g. p-toluene sulfonic acid or boron trifluoride. Said aldehydes can either be reduced or oxidized to 1-hydroxymethyl or 1-carboxy compounds respectively, which may further be processed as shown above, or reacted with nitromethane or potassium cyanide in order to yield the corresponding 1-(2-nitroethenyl)-compounds or cyanhydrides respectively. Finally, the isocyanates and urethanes can be obtained from said acid halides and sodium azide and decomposing the resulting acid azide according to Curtius, i.e. by pyrolysis in the presence or absence of an alcohol, e.g. a lower alkanol. The starting material mentioned under item (2) can be obtained according to the methods described in Compt. Rend. 139, p. 1805 (1954), J. Org. Chem. 27, p. 3844 (1962), Bull. Soc. Chim. France 1957, p. 346 and 1966, p. 1693.

Starting materials or final products that are mixtures of isomers or racemates, can be separated into the single isomers or racemates by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l-tartrates.

The pharmaceutically active compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatin, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragées or capsules, or in liquid form as solutions, suspensions or emulsions. They may be sterilized and/or contain adjuvants such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

Example 1

To the mixture of 2.3 g. magnesium turnings, 20 ml. tetrahydrofuran and 1 ml. ethyl bromide (starter), the solution of 11.4 g. 3-dimethylamino-propyl chloride in 20 ml. tetrahydrofuran is added dropwise while stirring and keeping the mixture under nitrogen. After refluxing for 45 minutes, it is cooled in an ice bath and the solution of 10 g. 1-oxo-1,2,3,4-tetrahydro-naphthalene-2-spiro - cyclohexane in 20 ml. tetrahydrofuran is added dropwise while stirring and stirring is continued for 3 hours at room temperature. After standing overnight, the solution is decanted from some unreacted magnesium and evaporated in vacuo. The residue is taken up in 150 ml. benzene and 75 ml. water are added dropwise while stirring and cooling in an ice bath. The mixture is warmed up, the supernatant solution decanted from the gelatinous residue, which is triturated three times with 75 ml. warm benzene, filtered off and washed with 150 ml. warm benzene. The combined organic solutions are washed with water, dried, filtered and evaporated in vacuo. The residue is recrystallized from hexane, to yield the 1-hydroxy-1-(3-dimethylamino-propyl)-1,2,3,-4-tetrahydronaphthalene-2-spirocyclohexane of the formula

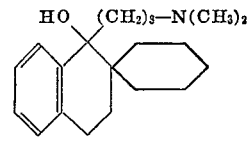

melting at 90–92°.

It is dissolved in 100 ml. ethyl acetate, the solution acidified with hydrogen chloride in ethyl acetate, the precipitate formed filtered off and recrystallized from isopropanol, to yield the corresponding hydrochloride melting at 214° with decomposition.

The starting material can be prepared as follows: To the suspension of 57.2 g. potassium t.-butoxide in 500 ml. benzene, the solution of 29.8 g. 1-oxo-1,2,3,4-tetrahydronaphthalene in 400 ml. benzene is slowly added while cooling and stirring under nitrogen. Hereupon the solution of 46.9 g. 1,5-dibromopentane in 50 ml. benzene is added during 45 minutes and the mixture slowly heated and refluxed for 5 hours. After standing overnight at room temperature, it is poured over 350 g. crushed ice and 80 ml. concentrated hydrochloric acid. The organic layer is separated and the aqueous solution extracted with diethyl ether. The combined organic solutions are washed with 5% aqueous sodium carbonate and water, dried, filtered and evaporated in vacuo. The residue is distilled and the fraction boiling at 122–128°/0.3 mm. Hg collected; it represents the 1-oxo-1,2,3,4-tetrahydronaphthalene-2-spirocyclohexane.

Example 2

To the Grignard reagent, prepared from 1.71 g. magnesium, 0.5 ml. ethyl bromide, 9.4 g. 1-methyl-4-chloropiperidine and 50 ml. tetrahydrofuran, the solution of 10 g. 1-oxo-1,2,3,4-tetrahydro-naphthalene-2-spirocyclohexane in 20 ml. tetrahydrofuran is added dropwise while stirring and cooling. The mixture is stirred for 4 hours at room temperature, allowed to stand overnight and evaporated in vacuo. The residue is taken up in benzene and the solution of 25 ml. glacial acetic acid in 25 ml. water is added dropwise while cooling. The organic layer is separated and washed with water. To the combined aqueous solution 5 g. ammonium chloride are added, followed by aqueous ammonia until it is basic. The mixture is extracted with diethyl ether, the extract washed with water, dried, filtered and evaporated in vacuo. The residue is recrystallized from aqueous methanol, to yield the 1 - hydroxy-1-(1-methyl-4-piperidyl)-1,2,3,4-tetrahydronaphthalene-2-spirocyclohexane of the formula

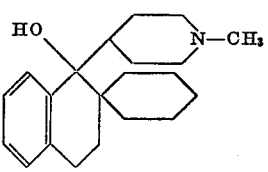

melting at 137–138°.

3 g. thereof are dissolved in 50 ml. ethyl acetate and 10 ml. isopropanol and the solution is acidified with hydrogen chloride in ethyl acetate. The precipitate formed is filtered off and washed with ethyl acetate, to yield the corresponding hydrochloride melting at 225° with decomposition.

Example 3

To the Grignard reagent prepared from 1.71 g. magnesium, 10.3 g. 1-methyl-3-chloromethyl-piperidine, 0.5 ml. ethyl bromide and 50 ml. tetrahydrofuran, the solution of 10 g. 1 - oxo - 1,2,3,4 - tetrahydro-naphthalene-2-spirocyclohexane in 20 ml. tetrahydrofuran is added dropwise while cooling and stirring, and stirring is continued for 5 hours at room temperature. After standing overnight, the mixture is evaporated in vacuo, the residue taken up in benzene and the solution of 25 ml. glacial acetic acid in 25 ml. water is added dropwise while stirring and cooling. The organic layer is separated, washed with water, the aqueous solutions combined and made basic with aqueous ammonia. The mixture is extracted with diethyl ether, the extract washed with water, dried, filtered and evaporated. The residue is recrystallized from aqueous methanol, to yield a solid fraction A and a mother liquor B. 2.4 g. of the solid A are taken up in 75 ml. hot ethyl acetate and isopropanol is added until dissolution occurs. The solution is then acidified with hydrogen chloride in ethyl acetate, the precipitate formed filtered off and washed with ethyl acetate-isopropanol, to yield the higher melting racemate (due to 2 asymmetric carbon atoms) of the 1-hydroxy-1-(1-methyl-3-piperidyl-methyl) - 1,2,3,4 - tetrahydro-naphthalene-2-spirocyclohexane hydrochloride of the formula

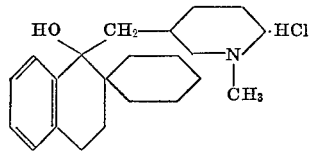

melting at 288° with decomposition.

The mother liquor B is evaporated in vacuo, the residue taken up in 50 ml. ethyl acetate, the solution acidified with hydrogen chloride in ethyl acetate, the precipitate formed filtered off, triturated with 100 ml. boiling chloroform and recrystallized from ethyl acetate-isopropanol, to yield the lower melting racemate of the above compound, melting at 220–221° with decomposition.

Example 4

According to the method described in the previous examples, the following compounds of Formula II are prepared:

[B₁=(CH₂)ₙ]

| R | R₁ | R₂ | R₃ | A | m | n | Salt | Melting point, degrees |
|---|---|---|---|---|---|---|---|---|
| OH | OCH₃ | H | H | —(CH₂)₃—N(CH₃)₂ | 2 | 5 | HCl | ¹226 |
| OH | H | OCH₃ | H | —(CH₂)₃—N(CH₃)₂ | 2 | 5 | -------- | 93–95 |
| OH | H | OCH₃ | OCH₃ | —(CH₂)₃—N(CH₃)₂ | 2 | 5 | -------- | 116–117 |
| OH | Cl | H | H | —(CH₂)₃—N(CH₃)₂ | 2 | 5 | HCl | (²) |
| OH | H | H | Cl | —(CH₂)₃—N(CH₃)₂ | 2 | 5 | HCl | (²) |
| OH | H | H | H | —(CH₂)₃—N(CH₃)₂ | 2 | 4 | HCl | 193 |
| OH | H | OCH₃ | H | —(CH₂)₃—N(CH₃)₂ | 2 | 4 | -------- | 76–78 |

¹ Decomposition.
² Mixture 201–205°.

The starting materials are prepared as follows: To the suspension of 57.2 g. potassium t.-butoxide in 500 ml. benzene, the solution of 36 g. 1-oxo-6-methoxy-1,2,3,4-tetrahydro-naphthalene in 150 ml. benzene is added during 30 minutes while cooling and stirring under nitrogen. Hereupon, the solution of 46.9 g. 1,5-dibromopentane in 100 ml. benzene is added during 45 minutes, the mixture is allowed to slowly warm up to room temperature and is refluxed for 5 hours while stirring. After standing overnight, it is poured over 350 g. crushed ice and 80 ml. concentrated hydrochloric acid, the organic layer separated and the aqueous solution extracted with diethyl ether. The combined organic solutions are washed with 5% aqueous sodium carbonate and water, dried, filtered and evaporated in vacuo. The residue is distilled and the fraction boiling at 160–163°/0.3 mm. Hg collected; it represents the 1-oxo-6-methoxy-1,2,3,4-tetrahydro-naphthalene-2-spirocyclohexane melting at 70–71.5° after recrystallization from methanol.

In the analogous manner, the following starting materials are prepared from equivalent amounts of the corresponding intermediates:

(a) 1-oxo-5-methoxy-1,2,3,4-tetrahydro-naphthalene-2-spirocyclohexane, B.P. 138–151°/0.2 mm. Hg;

(b) 1-oxo-1,2,3,4-tetrahydro-naphthalene-2-spirocyclopentane, B.P. 99–103°/0.2 mm. Hg;

(c) 1-oxo-6-methoxy-1,2,3,4-tetrahydro-naphthalene-2-spirocyclopentane, B.P. 144–146°/0.3 mm. Hg;

(d) 1-oxo-2,3-dihydro-indene-2-spirocyclohexane, B.P. 110–112°/0.3 mm. Hg, M.P. 53–56°.

Another starting material is prepared as follows: To the stirred solution of 86 g. butyrolactone and 1 kg. chlorobenzene, kept under nitrogen, 500 g. anhydrous aluminum chloride are added portionwise during 2 hours and the mixture is heated to 95° for 20 hours. After cooling it is poured over 2.5 kg. ice and 400 ml. concentrated hydrochloric acid. The organic layer is separated and the aqueous solution extracted with toluene. The combined organic solutions are washed with water, 200 ml. 20% aqueous potassium hydroxide and water again, dried, filtered and evaporated in vacuo. The residue is distilled and the fraction boiling at 115°/0.3 mm. Hg collected. According to vapor phase chromatography, it consists of 46–48% 5-chloro-, 16–22% 6-chloro- and 16–24% 7-chloro-1-oxo-1,2,3,4-tetrahydro-naphthalene. On standing at room temperature for several days, crystals separate, which are filtered off and washed with cooled pentane to yield the mixture consisting of 56.4% 5-chloro- and 43.6% 7 - chloro - 1 - oxo-1,2,3,4-tetrahydronaphthalene (fraction A). The filtrate is allowed to stand for about 1 week, during which time another precipitate is formed. It is filtered off and washed with cooled pentane to yield the mixture consisting of 60.9% 5-chloro-, 2.9% 6-chloro- and 33.7% 7-chloro-1-oxo-1,2,3,4-tetrahydro-naphthalene (fraction B). The solution of fraction A in pentane is subjected to thin layer chromatography on alumina and the eluate obtained from the faster moving band yields the 5-chloro-1-oxo-1,2,3,4-tetrahydro-naphthalene melting at 65.5–67°. The eluate from the slower moving material yields the 7-chloro-1-oxo-1,2,3,4-tetrahydro-naphthalene melting at 98–99.5°.

Fraction B is reacted as shown above, first with potassium t.-butoxide and the resulting potassium compound with 1,5-dibromopentane to yield:

(e) The mixture of 5-chloro- and 7-chloro-1-oxo-1,2,3,4 - tetrahydronaphthalene - 2-spirocyclohexane, B.P. 130–140°/0.2 mm. Hg.

Example 5

The mixture of 7 g. 1-hydroxy-1-(3-dimethylamino-propyl) - 6 - methoxy - 1,2,3,4-tetrahydro-naphthalene-2-spirocyclopentane (M.P. 76–78°), 30 ml. chloroform and 5 ml. acetyl chloride is refluxed for 70 minutes and evaporated in vacuo. The residue is taken up in water, the solution made basic with 2 N aqueous sodium hydroxide and extracted with diethyl ether. The extract is washed with water, dried, filtered and evaporated in vacuo. The residue is taken up in ethyl acetate, the solution acidified with hydrogen chloride in ethyl acetate, the precipitate formed filtered off and recrystallized from acetone to yield the 1 - (3-dimethylamino-propylidene)-6-methoxy-1,2,3,4- tetrahydro-naphthalene-2-spirocyclopentane hydrochloride of the formula

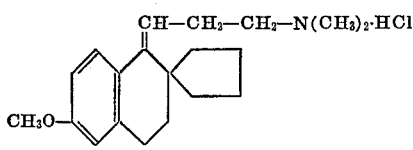

melting at 164–165°.

Example 6

To the Grignard reagent prepared from 1.6 g. magnesium, 8 g. 3-dimethylamino-propyl chloride, 0.5 ml. ethyl bromide and 50 ml. tetrahydrofuran, the solution of 5 g. 1-oxo-6-hydroxy-1,2,3,4-tetrahydro-naphthalene-2-spirocyclohexane in 60 ml. tetrahydrofuran is added dropwise while cooling and stirring, and stirring is continued for 3 hours at room temperature. After standing overnight, 75 ml. water are added while cooling and stirring followed by 50 ml. hot benzene. The organic solution is decanted off and hot benzene is added 3 more times. The combined organic solution is washed with water, dried, filtered and evaporated. The residue is recrystallized from chloroform-hexane to yield the 1-(3-dimethylamino-propylidene)-6-hydroxy-1,2,3,4-tetrahydro-naphthalene - 2 - spirocyclohexane of the formula

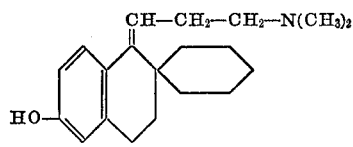

melting at 174–175°.

It is taken up in hot ethyl acetate, and the solution acidified with hydrogen chloride in ethyl acetate while cooling and stirring. The precipitate formed is filtered off and washed with ethyl acetate, to yield the corresponding hydrochloride melting at 172–174°.

Example 7

The hot solution of 2 g. 1-hydroxy-1-(3-dimethylaminopropyl)-6-methoxy - 1,2,3,4 - tetrahydro-naphthalene-2-spirocyclopentane (M.P. 76–78°) in the minimum amount of ethyl acetate is slowly acidified by the dropwise addition of hydrogen chloride in ethyl acetate while stirring. The precipitate formed after cooling is filtered off and recrystallized from acetone to yield the 1-(3-diethylamino-propylidene) - 6-methoxy-1,2,3,4-tetrahydro-naphthalene-2-spirocyclopentane hydrochloride; it is identical with the compound obtained according to Example 5.

Example 8

According to the method described in Examples 5–7, the following 1-dehydro derivatives corresponding to Formula II are prepared:

[B₁=(CH₂)ₙ]

| $R_1$ | $R_2$ | $R_3$ | RA | $m$ | $n$ | Salt | Melting point, degrees |
|---|---|---|---|---|---|---|---|
| H | H | H | =CH—(CH₂)₂—N(CH₃)₂ | 2 | 5 | HCl | 190–191 |
| H | OCH₃ | H | =CH—(CH₂)₂—N(CH₃)₂ | 2 | 5 | HCl | 189–190 |
| H | OCH₃ | OCH₃ | =CH—(CH₂)₂—N(CH₃)₂ | 2 | 5 | HCl | 164–167 |
| H | H | H | =CH—(CH₂)₂—N(CH₃)₂ | 1 | 5 | HCl | 211–212 |

Example 9

The mixture of 6.2 g. 1-(3-dimethylamino-propylidene)-6-methoxy - 1,2,3,4 - tetrahydro-naphthalene-2-spirocyclohexane, 1 g. platinum oxide and 100 ml. ethanol is hydrogenated at room temperature until 550 ml. hydrogen are absorbed. It is filtered, the filtrate evaporated in vacuo, the residue taken up in diethyl ether, the solution washed with water, dried, filtered and evaporated. The residue is distilled and the fraction boiling at 162–164°/0.3 mm. Hg collected, to yield the 1-(3-dimethylaminopropyl)-6-methoxy-1,2,3,4 - tetrahydro-naphthalene-2-spirocyclohexane of the formula

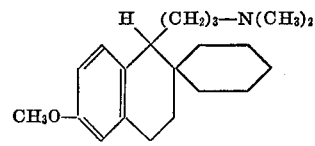

It is dissolved in anhydrous diethyl ether and the solution neutralized with hydrogen chloride in ethyl acetate. The precipitate formed is filtered off and washed with diethyl ether, to yield the corresponding hydrochloride melting at 137–141°.

Example 10

To the mixture of 0.5 g. lithium aluminum hydride and 25 ml. anhydrous diethyl ether, the solution of 1.0 g. 1 - (N,N-dimethylcarbamoyl-ethyl) - 6-methoxy-1,2,3,4-tetrahydro-naphthalene - 2-spirocyclohexane in 5 ml. diethyl ether is added dropwise while stirring and the whole is stirred at room temperature overnight. Hereupon 1.5 ml. ethyl acetate are added, followed by 0.5 ml. water, 1 ml. 5% aqueous sodium hydroxide and 1.5 ml. water. The precipitate formed is filtered off, washed with diethyl ether, the filtrate dried and evaporated. The residue is dissolved in the minimum amount of diethyl ether, the solution neutralized with hydrogen chloride in ethyl acetate, the precipitate formed filtered off and washed with diethyl ether, to yield the 1-(3-dimethylaminopropyl)-6-methoxy-1,2,3,4-tetrahydro-naphthalene-2-spirocyclohexane hydrochloride melting at 136–139°; it is identical with the product obtained according to Example 9.

The starting material is prepared as follows: To the Grignard reagent prepared from 1.7 g. magnesium, 50 ml. tetrahydrofuran and 11.9 g. 2-benzyloxy-ethyl chloride, the solution of 11 g. 1-oxo-6-methoxy-1,2,3,4-tetrahydro-naphthalene-2-spirocyclohexane in 20 ml. tetrahydrofuran is added dropwise while stirring and cooling. The mixture is stirred for 5 hours at room temperature and is allowed to stand overnight. It is again cooled in an ice bath, 30 ml. water are added dropwise, followed by the mixture of 15 ml. concentrated hydrochloric acid and 75 ml. water, as well as by 100 ml. diethyl ether. The organic layer is separated, the aqueous solution extracted with diethyl ether and the organic solution combined. They are washed with water, dried, filtered and evaporated. 10 g. of the residue is taken up in the minimum amount of hot glacial acetic acid, 3.5 g. 10% palladium on charcoal are added and the mixture is hydrogenated at about 25–70° and 50 p.s.i. until the theoretical amount of hydrogen has been absorbed. It is filtered, the filtrate evaporated in vacuo, the residue taken up in diethyl ether, the solution washed with 10% aqueous potassium carbonate, dried, filtered and evaporated, to yield the 1-(2-hydroxy-ethyl)-6-methoxy-1,2,3,4-tetrahydronaphthalene-2-spirocyclohexane.

To the mixture of 13.7 g. thereof, 50 ml. benzene and 4 g. pyridine, the solution of 9 g. thionyl chloride in 10 ml. benzene is added while stirring and cooling. The mixture is refluxed until the evolution of sulfur dioxide ceases. After cooling, it is washed with water and 1% aqueous potassium carbonate, dried, filtered and evaporated, to yield the 1-(2-chloro-ethyl)-6-methoxy-1,2,3,4-tetrahydro-naphthalene-2-spirocyclohexane.

13 g. thereof are added portionwise to the solution of 4 g. potassium cyanide, 4 ml. water and 16 ml. ethanol at 80° while stirring. Hereupon the mixture is refluxed for 5 hours and evaporated in vacuo. The residue is taken up in water, the mixture extracted with ethyl acetate, the extract washed with water, dried, filtered and evaporated in vacuo, to yield the 1-(2-cyano-ethyl)-6-methoxy-1,2,3, 4-tetrahydro-naphthalene-2-spirocyclohexane.

The mixture of 11 g. thereof, 12 ml. water, 12 g. sodium hydroxide and 40 ml. ethylene glycol is refluxed for 4 hours and poured into 200 ml. water. The solution obtained is acidified with concentrated hydrochloric acid and extracted with diethyl ether. The extract is washed with water, dried, filtered and evaporated. The residue is taken up in 10% aqueous potassium carbonate, the mixture washed with diethyl ether and acidified with hydrochloric acid. It is again extracted with diethyl ether, the extract dried, filtered and evaporated, to yield the 1-(2-carboxy-ethyl)-6-methoxy-1,2,3,4-tetrahydro-naphthalene-2-spirocyclohexane.

The mixture of 5.5 g. thereof, 25 ml. benzene and 2.5 ml. thionyl chloride is refluxed for 1 hour and evaporated in vacuo. To the residue benzene is added, which again is distilled off. The residue is dissolved in 25 ml. benzene, and the solution added dropwise to the mixture of 3.0 g. dimethylamine in 25 ml. benzene while stirring and keeping the temperature below 20°. The mixture is stirred overnight at room temperature, and the precipitate formed filtered off. The filtrate is evaporated in vacuo, the residue taken up in diethyl ether, the solution washed with water, 2 N aqueous hydrochloric acid, 2 N aqueous sodium hydroxide and water, dried, filtered and evaporated, to yield the 1-(N,N-dimethylcarbamoyl-ethyl)-6-methoxy-1, 2,3,4-tetrahydro-naphthalene-2-spirocyclohexane, which is used as such without further purification.

The above-mentioned chloroethyl compound may be reacted with an excess of di-n-butylamine, pyrrolidine, morpholine or 1-methyl-piperazine, in order to yield the 1 - (2-di-n-butylamino-, pyrrolidino-, morpholino- or N-methyl-piperazino-ethyl) - 6 - methoxy-1,2,3,4-tetrahydro-naphthalene-2-spirocyclohexane.

The above-mentioned cyano compound may also be reduced as shown above for the dimethylamide, to yield the 1 - (3 - aminopropyl) - 6-methoxy-1,2,3,4-tetrahydro-naphthalene-2-spirocyclohexane.

Example 11

Preparation of 10,000 tablets each containing 100.0 mg. or 50.0 mg. of the active ingredient:

Formula A: G.
  1 - hydroxy-1-(3-dimethylamino-propyl)-1,
    2,3,4 - tetrahydro-naphthalene - 2-spiro-
    cyclohexane hydrochloride _____ 1,000.00
  Lactose _____ 2,535,00
  Corn starch _____ 125.00
  Polyethylene glycol 6,000 _____ 150.00
  Talcum powder _____ 150.00
  Magnesium stearate _____ 40.00
  Purified water, q.s.

Formula B: G.
  1 - (3 - dimethylamino - propylidene)-me-
    thoxy - 1,2,3,4-tetrahydro-naphthalene-2-
    spirocyclopentane hydrochloride _____ 500.00
  Lactose _____ 1,706,00
  Corn starch _____ 90.00
  Polyethylene glycol 6,000 _____ 90.00
  Talcum powder _____ 90.00
  Magnesium stearate _____ 24.00
  Purified water, q.s.

Procedure: All the powders are passed through a screen with openings of 0.6 mm. Then the drug substance, lactose, talcum, magnesium stearate and half of the starch are mixed in a suitable mixer. The other half of the starch is suspended in 65 ml. water for A or 45 ml. water for B and the suspension added to the boiling solution of the polyethylene glycol in 260 ml. water for A or 180 ml. water for B. The paste formed is added to the powders which are granulated, if necessary, with an additional amount of water. The granulate is dried overnight at 35°, broken on a screen with 1.2 mm. openings and compressed into tablets using concave punches with 10.3 mm. diameter for A or 7.1 mm. diameter for B, uppers bisected.

In the analogous manner tablets are prepared, comprising a compound of the remaining examples as the active ingredient.

Example 12

To the Grignard reagent, prepared from 2.11 g. magnesium, 0.5 ml. ethylbromide and 10.6 g. 3-dimethylamino-propyl chloride in 40 ml. tetrahydrofuran, the solution of 9.9 g. 1 - oxo - 1,2,3,4 - tetrahydro-naphthalene-2-spirocycloheptane in 20 ml. tetrahydrofuran is added dropwise during 20 minutes while cooling, the mixture stirred for 3 hours at room temperature and allowed to stand overnight. It is decanted from unreacted magnesium, evaporated in vacuo and the residue taken up in 150 ml. benzene. To the solution 75 ml. water are added dropwise while stirring and cooling in an ice bath and the mixture warmed up at the steam cone. The organic layer is decanted off and the gelatinous residue extracted 3 times with 75 ml. hot benzene while stirring. It is finally filtered off, washed with 150 ml. hot benzene, the combined organic solutions washed with water, dried and evaporated. The residue is taken up in 75 ml. ethyl acetate and the solution strongly acidified with hydrogen chloride in ethyl acetate. The precipitate formed is filtered off, washed with ethyl acetate and recrystallized from isopropanol, to yield the 1-hydroxy - 1 - (3 - dimethylamino - propyl)-1,2,3,4-tetrahydronaphthalene - 2 - spirocycloheptane hydrochloride of the formula

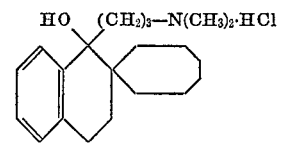

melting at 218° with decomposition.

In the analogous manner the corresponding 6-methoxy-base is prepared. It dehydrates in the strongly acidic medium, to yield the 1 - (3 - dimethylaminopropylidene)-6 - methoxy - 1,2,3,4 - tetrahydronaphthalene - 2 - spirocycloheptane hydrochloride of the formula

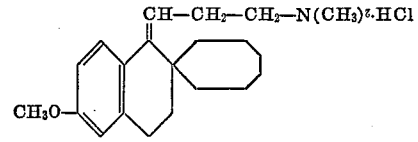

melting at 188-189° after recrystallization from acetone.

Example 13

To the Grignard reagent, prepared from 1.49 g. magnesium, 0.5 ml. ethylbromide, 7.46 g. 3-dimethylamino-propyl chloride and 40 ml. tetrahydrofuran, the solution of 7 g. 1 - oxo - 4 - benzosuberane - 2 - spirocyclohexane in 20 ml. tetrahydrofuran is added dropwise while stirring and cooling. After standing overnight at room temperature, the solution is decanted off and evaporated in vacuo. The residue is taken up in benzene, to the solution 60 ml. water are added dropwise while cooling and stirring and the mixture warmed up in water. The organic solution is decanted off, the residue triturated with warm benzene and the combined organic solutions washed with water, dried, filtered and evaporated. The residue is taken up in 200 ml. ethyl acetate and the solution acidified with hydrogen chloride in ethyl acetate. The precipitate formed is filtered off and recrystallized from isopropanol, to yield the 1 - hydroxy - 1 - (3-dimethylamino-propyl)-benzo-suberane-2-spirocyclohexane hydrochloride of the formula

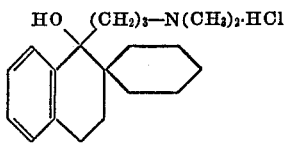

melting at 258° with decomposition.

Example 14

To the Grignard reagent, prepared from 2.22 g. magnesium, 0.5 ml. ethyl bromide and 11.1 g. 3 - dimethylamino-propyl chloride in 40 ml. tetrahydrofuran, the solution of 9.7 g. 1 - oxo - 1,2,3,4 - tetrahydronaphthalene-2-spirocyclo-3-hexene in 20 ml. tetrahydrofuran is added dropwise while stirring and cooling. The mixture is stirred for 5 hours at room temperature and allowed to stand overnight. The supernatant solution is decanted off, evaporated in vacuo, the residue taken up in 100 ml. benzene and to the solution 50 ml. water are added dropwise while stirring and cooling. The mixture is heated at the steam cone, the organic layer separated and the residue triturated 3 times with 75 ml. hot benzene and finally washed with 100 ml. benzene. The combined solutions are washed with water, dried, filtered, evaporated and the residue recrystallized from hexane, to yield the 1 - hydroxy - 1 - (3-dimethylamino-propyl) - 1,2,3,4 - tetrahydronaphthalene-2-spirocyclo - 3 - hexene of the formula

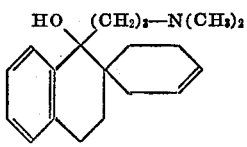

melting at 93–95°. The corresponding hydrochloride melts at 203–205° with decomposition.

Example 15

The solution of 4 g. 1 - hydroxy - 1 - (3-dimethylamino - propyl) - 1,2,3,4 - tetrahydro - naphthalene-2-spirocyclo-3-hexene in 50 ml. chloroform and 3.35 ml. acetyl chloride is refluxed for 70 minutes and evaporated in vacuo. The residue is taken up in water, the solution strongly acidified with concentrated hydrochloric acid and washed with diethyl ether. The aqueous solution is made basic with 6 N aqueous sodium hydroxide, extracted with diethyl ether, the extract washed with water, dried and evaporated. The residue is taken up in ethyl acetate, the solution acidified with hydrogen chloride in ethyl acetate, the precipitate formed filtered off and washed with ethyl acetate, to yield the 1 - (3-dimethylamino-propylidene)-1,2,3,4 - tetrahydro - naphthalene - 2 - spirocyclo-3-hexene hydrochloride of the formula

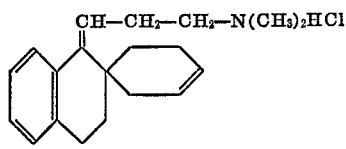

melting at 197° with decomposition.

Example 16

The mixture of 42 g. 1,6 - dihydroxy - 1 - (3-dimethyl-aminopropyl)-1,2,3,4 - tetrahydro - naphthalene - 2 - spirocyclohexene, 250 ml. chloroform and 38 ml. acetyl chloride is heated at the steam cone for 70 minutes and evaporated in vacuo. The residue is taken up in water, the solution washed with diethyl ether and the aqueous layer made basic with 2 N aqueous sodium hydroxide. It is extracted 3 times with diethyl ether, the extract washed with water, dried and evaporated. The residue is taken up in ethyl acetate, the solution acidified with hydrogen chloride in ethyl acetate, the precipitate formed, filtered off and recrystallized from isopropanol-ethyl acetate, to yield the 1 - (3 - dimethylamino-propylidene)-6-acetoxy-1,2,3,4-tetrahydronaphthalene-2-spirocyclohexane hydrochloride of the formula

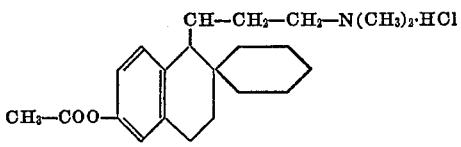

melting at 188–189°.

Example 17

To the Grignard reagent prepared from 1.71 g. magnesium, 10.3 g. 1 - methyl - 3 - chloromethyl-piperidine, 0.5 ml. ethyl bromide and 50 ml. tetrahydrofuran, the solution of 11.6 g. 1 - oxo - 6 - methoxy - 1,2,3,4-tetrahydro-naphthalene - 2 - spirocyclopentane in 20 ml. tetrahydrofuran is added dropwise while cooling and stirring, and stirring is continued for 5 hours at room temperature. After standing overnight, the mixture is evaporated in vacuo, the residue taken up in benzene and the solution of 25 ml. glacial acetic acid in 25 ml. water is added dropwise while stirring and cooling. The organic layer is separated, washed with water, the aqueous solutions combined and made basic with aqueous ammonia. The mixture is extracted with diethyl ether, the extract washed with water, dried, filtered and evaporated. The residue is taken up in 100 ml. ethyl acetate, the solution acidified with hydrogen chloride in ethyl acetate and the precipitate formed filtered off. It is several times triturated with warm acetone, to yield the 1-hydroxy - 1 - (1 - methyl - 3 - piperidylmethyl)-6-methoxy-1,2,3,4 - tetrahydro-naphthalene - 2 - spirocyclopentane hydrochloride of the formula

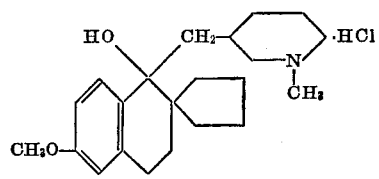

melting at 219° with decomposition.

The acetone solution is evaporated in vacuo, the residue combined with that obtained from the ethyl acetate filtrate, and taken up in water. The solution is washed with diethyl ether, made basic with 2 N aqueous sodium hydroxide and extracted with diethyl ether. The extract is washed with water, dried and evaporated in vacuo. 9.8 g. of the residue are taken up in 25 ml. ethyl acetate, the solution combined with that of 3.5 g. maleic acid in 25 ml. warm isopropanol and the mixture allowed to stand in the refrigerator overnight. The precipitate formed is collected, triturated with diethyl ether, washed with cold ethyl acetate-isopropanol (3:1), dried and recrystallized from 100 ml. ethyl acetate, to yield the 1-(1 - methyl - 3 - piperidylmethylidene) - 6 - methoxy-1,2,3,4 - tetrahydro-naphthalene - 2 - spirocyclopentane maleate of the formula

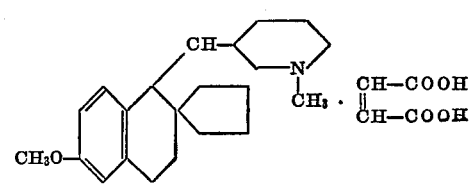

melting at 144–146°.

Example 18

To the Grignard reagent prepared from 12.7 g. magnesium and 63.5 g. 3-dimethylamino-propyl chloride in 400 ml. tetrahydrofuran, the solution of 40 g. 1-oxo-6-hydroxy - 1,2,3,4 - tetrahydro-naphthalene - 2-spirocyclohexane in 200 ml. tetrahydrofuran is added dropwise while cooling and stirring, and stirring is continued for 5 hours at room temperature. After standing overnight, 200 ml. water are added while cooling, followed by 200 ml. benzene. The organic solution is decanted off and the residue is triturated 3 more times with benzene. The combined organic solutions are washed with water, dried, filtered and evaporated in vacuo. The residue is taken up in the minimum amount of isopropanol and the solution diluted with about the same volume hexane, to yield the 1,6 - dihydroxy - 1 - (3 - dimethylamino-propyl)-1,2,3,4 - tetrahydro-naphthalene-2-spirocyclohexane of the formula

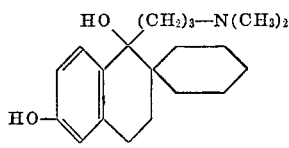

melting at 108–115°. Under these mild conditions (avoiding hot benzene as well as acidic chloroform and evaporating in vacuo), dehydration does not occur, as is the case in Examples 6, 12 and 17.

Example 19

Through the solution of 3.5 g. 1-(3-dimethylamino-propylidene) - 6 - methoxy - 1,2,3,4 - tetrahydro-naphthalene - 2 - spirocyclopentane in 35 ml. ethanol, methyl bromide is bubbled for 20 minutes while stirring at room temperature, and the mixture is allowed to stand for 2½ days. It is evaporated in vacuo, the residue triturated with diethyl ether and recrystallized from isopropanol, to yield the 1-(3-trimethylammonium-propylidene) - 6 - methoxy - 1,2,3,4 - tetrahydro - 2 - spirocyclopentane bromide of the formula

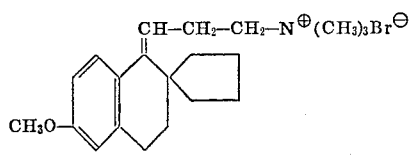

melting at 223–224°.

Example 20

The solution of 3 g. 1 - (2 - nitro-ethenyl) - 1,2,3,4-tetrahydro-naphthalene - 2 - spirocyclopentane in 15 ml. tetrahydrofuran is added dropwise to the stirred mixture of 0.7 g. lithium aluminum hydride in 17 ml. diethyl ether. After refluxing the mixture for 6 hours, it is cooled and 0.7 ml. water, 1.4 ml. 12% aqueous sodium hydroxide and 2.1 ml. water are added in this sequence. It is filtered, the filtrate washed with water, dried, evaporated and the residue taken up in ethyl acetate. The solution is acidified with hydrogen chloride in ethyl acetate, the precipitate formed filtered off and recrystallized from acetone, to yield the 1-(2-aminoethyl) - 1,2,3,4 - tetrahydro-naphthalene - 2 - spirocyclopentane hydrochloride of the formula

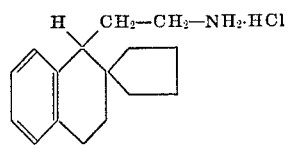

showing in the I.R spectrum inter alia bands at 750, 1250, 1600 and 2500 cm.$^{-1}$.

The starting material is prepared as follows: The mixture of 2.4 g. sodium hydride and 80 ml. dimethylsulfoxide is heated to 75° under nitrogen until the evolution of hydrogen ceases. It is cooled to room temperature, diluted with 80 ml. tetrahydrofuran and rapidly combined with the solution of 20.4 g. trimethylsulfoniumiodide in 80 ml. dimethylsulfoxide while stirring at −5 to −10°. Hereupon the solution of 20 g. 1-oxo-1,2,3,4-tetrahydro-naphthalene-2-spirocyclopentane in 20 ml. tetrahyldrofuran is added during 10 minutes while stirring at said temperature. After 15 minutes, the mixture is stirred for 45 minutes at room temperature. It is combined with 800 ml. water, extracted with diethyl ether, the extract washed with water, dried and evaporated in vacuo, to yield the 1,2,3,4-tetrahydro-naphthalene - 1 - spirooxirane-2-spirocyclopentane.

10.7 g. of said epoxide is added to the azeotropically dried solution of 2.0 g. p-toluene sulfonicacid in 200 ml. benzene, and the whole is refluxed for 16 hours. After cooling, it is washed with aqueous potassium carbonate and water, dried, filtered and evaporated in vacuo, to yield the 1,2,3,4-tetrahydro-naphthalene-2-spirocyclopentane-1-carboxaldehyde.

To the mixture of 5.3 g. thereof, 1.6 g. nitromethane and 30 ml. methanol, 4.6 ml. 5 N aqueous sodium hydroxide are added dropwise while stirring and cooling in an ice bath. After stirring for 3 hours at 20–25°, the mixture is strongly acidified with 6 N hydrochloric acid while cooling and diluted with water. The precipitate formed is filtered off and washed with water, to yield the 1-(2-nitroethenyl)-1,2,3,4-tetrahydro-naphthalene - 2 - spirocyclopentane.

Example 21

According to the method described in Example 3, the 1-hydroxy-1-(1-methyl - 3 - piperidylmethyl)-1,2,3,4-tetrahydro-naphthalene-2 - spirocyclopentane hydrochloride, M.P. 214° (dec.) and, according to Example 9, the 1-(3-dimethylaminopropyl)-6-methoxy - 1,2,3,4 - tetrahydronaphthalene-2-spirocyclopentane hydrochloride, M.P. 174–176°, are prepared from equivalent amounts of the corresponding starting material.

I claim:

1. A compound having the formula

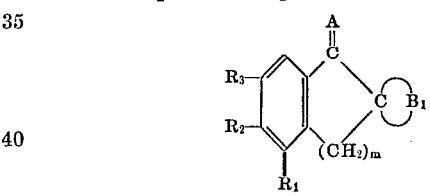

in which each of $R_1$, $R_2$ and $R_3$ is hydrogen or one or two thereof are lower alkoxy, or one thereof is hydroxy, or halogen and the others are hydrogen, A is di-lower alkylamino-lower alkylidene, $B_1$ is 1,4-butylene, 1,5-pentylene, 1,6-hexylene or 1,5-pent-2-enylene and $m$ is the integer 1, 2 or 3, the N-oxides or therapeutically acceptable acid addition salts thereof.

2. A compound as claimed in claim 1, in which formula each of $R_1$, $R_2$ and $R_3$ is hydrogen or one or two thereof are methoxy or one thereof is hydroxy, or chloro and the others are hydrogen, A is 3-(dimethylamino- or diethylamino)-propylidene, $B_1$ is 1,4-butylene, 1,5-pentylene, 1,6-hexylene or 1,5-pent-2-enylene and $m$ is the integer 1, 2, or therapeutically acceptable acid addition salts thereof.

3. A compound of the formula

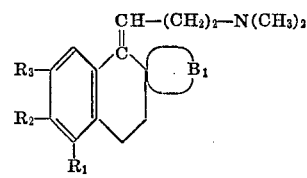

wherein each of $R_1$, $R_2$ and $R_3$ is hydrogen or one or two thereof are lower alkoxy, or one hereof is hydroxy, or halogens and the others are hydrogen, and $B_1$ is 1,4-butylene, 1,5-pentylene, 1,6-hexylene or 1,5-pent-2-enylene, the N-oxides or therapeutically acceptable acid addition salts thereof.

4. A compound as claimed in claim 3 and being the 1-(3 - dimethylaminopropylidene)-1,2,3,4-tetrahydro-naphthalene-2-spirocyclopentane or a therapeutically acceptable acid addition salt thereof.

5. A compound as claimed in claim 3 and being the 1-(3-dimethylaminopropylidene)-6-methoxy-1,2,3,4-tetrahydro-naphthalene-2-spirocyclohexane or a therapeutically acceptable acid addition salt thereof.

6. A compound as claimed in claim 3 and being the 1-(3-dimethylaminopropylidene)-6-methoxy-1,2,3,4-tetrahydro-naphthalene-2-spirocyclopentane or a therapeutically acceptable acid addition salt thereof.

References Cited
UNITED STATES PATENTS

| | | | |
|---|---|---|---|
| 2,914,561 | 11/1959 | Allen et al. | 260—570 |
| 2,914,562 | 11/1959 | Allen et al. | 260—570 |
| 2,914,563 | 11/1959 | Allen et al. | 260—570 |
| 2,914,564 | 11/1959 | Allen et al. | 260—570 |
| 2,971,001 | 2/1961 | Palopoli et al. | 260—567.6 |

OTHER REFERENCES

Burger, "Medicinal Chemistry," 2nd ed. pp. 82–83 (1960).

Protiva et al., "Journal Med. Chem.," vol. 4, No. 2, pp. 411–415 (1961).

ROBERT V. HINES, Primary Examiner

U.S. Cl. X.R.

260—239 A, B, R, 240 R, 243 B, 247, 247.2 B, 247.7 A, 268 R, C, 293, 294.3, 294.7, 326.14 T, 326.3, 326.5 C, 326.81, 348 R, 456 R, P, 465 F, 479 R, 490, 501.11, 501.12, 501.18, 501.19, 501.21, 515 R, 520, 544 M, 558 R, 562 R, 567.5, 567.6 M, 570.8 R, 590, 606.5 F, 612 R, 618 F, 645, 665 G; 424—244, 246, 248, 250, 267, 274, 280, 329, 330